US012381842B2

(12) United States Patent
Belling et al.

(10) Patent No.: US 12,381,842 B2
(45) Date of Patent: Aug. 5, 2025

(54) PHYSICAL SERVICE COMMUNICATION PROXY DOMAIN

(71) Applicant: Nokia Solutions and Networks Oy, Espoo (FI)

(72) Inventors: Thomas Belling, Erding (DE); Bruno Landais, Pleumeur-Bodou (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/320,628

(22) Filed: May 14, 2021

(65) Prior Publication Data

US 2021/0367916 A1  Nov. 25, 2021

Related U.S. Application Data

(60) Provisional application No. 63/028,319, filed on May 21, 2020.

(51) Int. Cl.
*H04L 61/2521* (2022.01)
*H04L 61/4511* (2022.01)
(Continued)

(52) U.S. Cl.
CPC ...... *H04L 61/2528* (2013.01); *H04L 61/4511* (2022.05); *H04L 61/4541* (2022.05); *H04L 41/046* (2013.01); *H04L 61/35* (2013.01)

(58) Field of Classification Search
CPC ............. H04L 61/2528; H04L 61/4511; H04L 61/4541; H04L 41/046; H04L 61/35;
(Continued)

(56) References Cited

U.S. PATENT DOCUMENTS 11,018,971 B2 * 5/2021 Mahalank ............... H04L 67/56
11,082,393 B2 * 8/2021 Goel .................... H04L 61/4541
(Continued)

FOREIGN PATENT DOCUMENTS

CN   110798360 A   2/2020
CN   111052711 A   4/2020
(Continued)

OTHER PUBLICATIONS

"Enablers for Multiple SCPs (23.501)", 3GPP TSG-SA2 Meeting #138-E, S2-2003190r02 (revision 2) (Year: 2020).*
(Continued)

*Primary Examiner* — Alex Tran
(74) *Attorney, Agent, or Firm* — SQUIRE PATTON BOGGS (US) LLP

(57) ABSTRACT

Systems, methods, apparatuses, and computer program products for implementing a physical service communication proxy domain A method may include interconnecting a first network element with one or more service communication proxy domains, each associated with one or several internet protocol addresses or fully qualified domain names used for the interconnection. The method may also include registering the first network element with a network repository function by sending a service operation to the network repository function. Further, the service operation may include profile information of the first network element. In addition, the profile information may include one or more service communication proxy domains, each associated with one or several internet protocol addresses or fully qualified domain names.

10 Claims, 8 Drawing Sheets

(51) Int. Cl.
*H04L 61/4541* (2022.01)
*H04L 41/046* (2022.01)
*H04L 61/00* (2022.01)

(58) Field of Classification Search
CPC . H04L 67/51; H04L 61/3025; H04L 41/5058; H04L 61/59; H04W 8/26
See application file for complete search history.

(56) References Cited

U.S. PATENT DOCUMENTS

| | | | | |
|---|---|---|---|---|
| 2019/0230556 | A1* | 7/2019 | Lee | H04W 28/16 |
| 2020/0127916 | A1 | 4/2020 | Krishan | |
| 2021/0258864 | A1* | 8/2021 | Jeong | H04W 48/16 |
| 2021/0258871 | A1* | 8/2021 | Jeong | H04W 24/02 |
| 2022/0060548 | A1* | 2/2022 | Wang | H04L 67/51 |
| 2022/0393971 | A1* | 12/2022 | Bartolome Rodrigo | |
| | | | | H04L 45/20 |

FOREIGN PATENT DOCUMENTS

| | | | |
|---|---|---|---|
| EP | 3866559 | A1 | 8/2021 |
| WO | 2020/002507 | A1 | 1/2020 |
| WO | 2020/094547 | A1 | 5/2020 |
| WO | WO-2021233646 | A1 * | 11/2021 |

OTHER PUBLICATIONS

"Enablers for Multiple SCPs (23.501)", 3GPP TSG-SA2 Meeting #138-E, S2-2003269, Oracle Corporation, Apr. 20-23, 2020, 11 pages. (Year: 2020).*
"Enablers for Multiple SCPs (23.502)", 3GPP TSG-SA2 Meeting #138-E, S2-2003270, Oracle Corporation, Apr. 20-23, 2020, 7 pages. (Year: 2020).*
"Enablers for Multiple SCPs (23.501)", 3GPP TSG-SA2 Meeting #138-E, S2-2003190r02 (revision 2), Oracle Corporation, Apr. 7, 2020, (Year: 2020).*
"Enablers for Multiple SCPs (23.501)", 3GPP TSG-SA2 Meeting #138-E, S2-2003269 (Was S2-2003190R08), Ericsson, Apr. 24, 2020 (Year: 2020).*
"3rd Generation Partnership Project; Technical Specification Group Core Network and Terminals; 5G System; Network Function Repository Services; Stage 3 (Release 16)", 3GPP TS 29.510, V16.3.0, Mar. 2020, pp. 1-172.
"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.
"3rd Generation Partnership Project; Technical Specification Group Services and System Aspects; Procedures for the 5G System (5GS); Stage 2 (Release 16)", 3GPP TS 23.502, V16.4.0, Mar. 2020, pp. 1-582.
"Enablers for Multiple SCPs (23.501)", 3GPP TSG-SA2 Meeting #138-E, S2-2003269, Oracle Corporation, Apr. 20-23, 2020, 11 pages.
"Enablers for Multiple SCPs (23.502)", 3GPP TSG-SA2 Meeting #138-E, S2-2003270, Oracle Corporation, Apr. 20-23, 2020, 7 pages.
"3rd Generation Partnership Project; Technical Specification Group Core Network and Terminals; 5G System; Principles and Guidelines for Services Definition; Stage 3 (Release 16)", 3GPP TS 29.501, V16.3.0, Mar. 2020, pp. 1-70.
"SCP Profile Registration and Discovery", 3GPP TSG-CT WG4 Meeting #98e, C4-203133, Nokia, Jun. 2-12, 2020, 44 pages.
Extended European Search Report received for corresponding European Patent Application No. 21174884.3, dated Sep. 28, 2021, 8 pages.
"Enablers for multiple SCPs (23.501)", 3GPP TSG-SA2 Meeting #138-E, S2-2003190, Oracle Corporation, Apr. 20-23, 2020, 12 pages.
"SCP Registration/Update/Deregistration in NRF", 3GPP TSG-SA/WG2 Meeting #138E, S2-2002675, CATT, Apr. 20-24, 2020, 5 pages.
Communication pursuant to Article 94(3) EPC dated Sep. 15, 2022 corresponding to European Patent Application No. 21174884.3.
European Office Action issued in corresponding European Patent Application No. 21 174 884.3-1203 on Jul. 14, 2023.
European Notice of Allowance issued in corresponding European Patent Application No. 21174884.3 on Nov. 21, 2023.
European Communication issued in corresponding European Patent Application No. 21 174 884.3-1203 on Mar. 26, 2024.
Chinese Office Action issued in corresponding Chinese Patent Application No. 202110550448.0 on Oct. 24, 2023.
3GPP TSG-SA2 Meeting #138-E, Online Apr. 20-23, 2020, S2-2003190R21, Enablers for multiple SCPs (23.501), Oracle Corporation, Verizon UK Ltd., 10 pages.
3GPP TSG SA2 Meeting #138E, Apr. 20-24, 2020, Electronic, Elbonia, SA WG2 Temporary Document, S2-2003016, Huawei, Hisilicon, "Communication Between Consumer and Producer with Multi SCP", 4 pages.
3GPP TSG-SA2 Meeting #138-E, Online, Apr. 20-23, 2020, S2-2003270 (Was S2-2003193r09), "Enablers for Multiple SCPs (23.502)", Oracle Corporation, Verizon UK Ltd, Nokia, Nokia Shanghai-Bell, Samsung, Ericsson, ITRI, CATT, AT&T, ZTE, InterDigital, 7 pages.

* cited by examiner

Definition of type ScpInfo

| Attribute name | Data type | P | Cardinality | Description |
|---|---|---|---|---|
| scpDomainInfoList | map(ScpDomainInfo) | O | 1..N | List of SCP domains the SCP belongs to and associated SCP addressing information. The SCP Domain IDs shall be the keys of the map. |
| addressDomains | array(string) | O | 1..N | Pattern (regular expression according to the ECMA-262 dialect) representing the address domain names reachable through the SCP. |
| servedNfSetIdList | array(NfSetId) | O | 1..N | List of NF setID of NFs served by the SCP. |
| servedNfTypeList | array(NFType) | O | 1..N | List of NF types served by the SCP. |
| remotePlmnList | array(PlmnId) | O | 1..N | List of remote PLMNs reachable through the SCP. |

Definition of type ScpDomainInfo

| Attribute name | Data type | P | Cardinality | Description |
|---|---|---|---|---|
| fqdn | Fqdn | O | 0..1 | FQDN of the SCP |
| ipv4Addresses | array(Ipv4Addr) | O | 1..N | IPv4 address(es) of the SCP |
| ipv6Addresses | array(Ipv6Addr) | O | 1..N | IPv6 address(es) of the SCP |
| relpv4Addresses | array(Ipv4Addr) | O | 1..N | List of IPv4 addresses reachable through the SCP. |
| relpv6Prefixes | array(Ipv6Prefix) | O | 1..N | List of IPv6 prefixes reachable through the SCP. |
| relpv4AddrRanges | array(Ipv4AddressRange) | O | 1..N | List of IPv4 addresses ranges reachable through the SCP. |
| relpv6PrefixRanges | array(Ipv6PrefixRange) | O | 1..N | List of IPv6 prefixes ranges reachable through the SCP. |

FIG. 3

PHYSICAL SERVICE COMMUNICATION PROXY DOMAIN

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for implementing a physical service communication proxy domain.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

BRIEF DESCRIPTION OF THE DRAWINGS

For proper understanding of example embodiments, reference should be made to the accompanying drawings, wherein:

FIG. 3 illustrates an example set of tables relating to definitions of a type of SCP information, and definitions of a type of SCP domain information, according to certain example embodiments.

DETAILED DESCRIPTION

Figure 1:
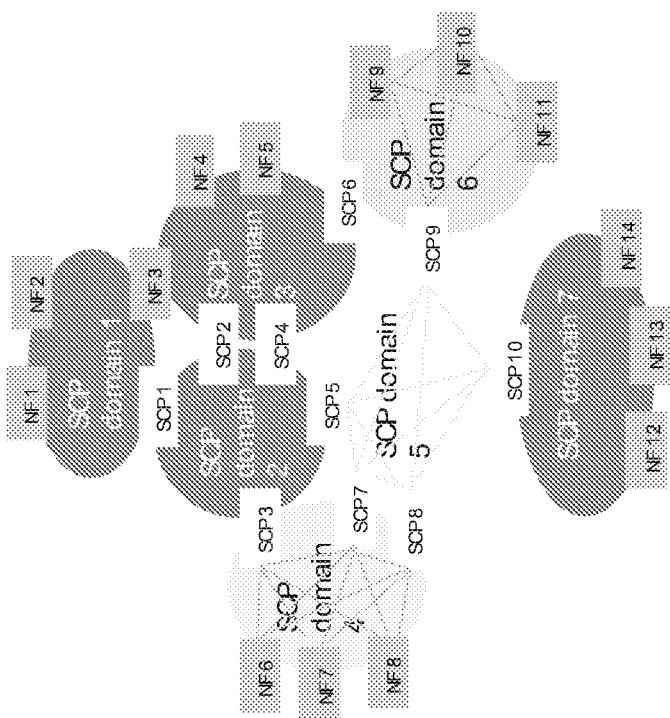
FIG. 1 illustrates an example of interconnections between various service communication proxy (SCP) domains.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for implementing a physical service communication proxy domain.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

As part of the 5G core network, a network repository function (NRF) may provide support for the registration and discovery of network functions (NFs). For example, the NRF may store profiles registered by NFs, and supply those profiles to other NFs as part of discovery procedures. The 5G core network may also include one or more service communication proxies (SCPs) that support indirect communications between NFs and message forwarding and routing to destination NF/NF service. SCPs may also support delegated discovery of destination NFs or services on behalf of an NF sending a request message. In addition, the NRF may maintain the SCP profile of available SCP instances, and allow other NF or SCP instances to subscribe to, and be notified about, the registration in NRF of new NF instances of a given type or new SCP instances. Furthermore, NRF may provide support of service discovery function, receive NF discovery requests from NF or SCP instances, and provide the information of the available instances fulfilling certain criteria (e.g., supporting a given instance). In addition, the NRF may support SCP discovery function. For example, the NRF may receive NF discovery requests for SCP profiles, and provide the information of the available SCP instances fulfilling certain criteria (e.g., serving a given NF set).

$3^{rd}$ Generation Partnership Project (3GPP) provides a solution for SCP discovery in scenarios with multiple SCPs in a signaling path. Further, the NRF may be enhanced with a new SCP profile that the SCP registers and can discover using existing NRF services. FIG. 1 illustrates an example of interconnections between various SCP domains. In describing the topology, SCP domains of directly interconnected SCPs may be introduced. For example, as illustrated in FIG. 1, the SCP profile may list all SCP domains that an SCP is interconnected to and, thus, may also identify SCPs that interconnect certain domains.

Figure 2:
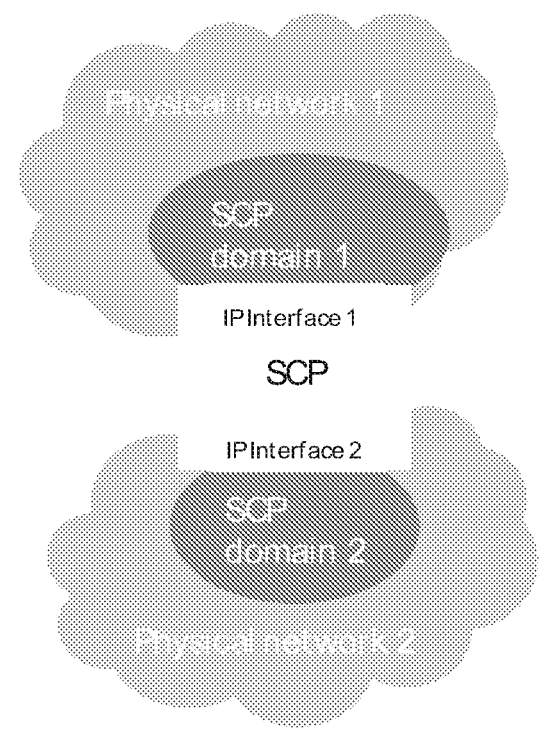
FIG. 2 illustrates an example of interconnections of an SCP to different physical networks and SCP domains.

In certain cases, the SCP profile may include information about the SCP domains the SCP is interconnected with, and information about Internet Protocol (IP) addresses or fully qualified domain names (FQDNs) the SCP exhibits (i.e. IP addresses or FQDNs of the SCP, to be used by other SCP or NF to send signaling to the SCP). However, the information about SCP domains and about IP addresses or FQDNs of the SCP is not related in the SCP profile. This may be acceptable in some cases as long as the SCP domains are logical constructs, and all SCP domains are reachable through all IP interfaces. FIG. 2 illustrates an example of interconnections between physical networks and SCP domains. For instance, should several physical networks (e.g., separate IPv6 networks, several overlapping IPv4 private address domains, or some separate Ethernet networks) be deployed in a public land mobile network (PLMN), it may be likely that they are interconnected through certain SCPs, and that separate IP interfaces in those SCPs are directed towards those physical networks.

According to certain example embodiments, SCP profiles registered in NRF may be enhanced to describe which SCP addresses or FQDNs relate to which SCP domain. For example, in certain example embodiments, a first SCP, SCP 1, may supply this information to the NRF when SCP 1 is registering at the NRF. Further, the NRF may provide the information about which SCP addresses or FQDNs relate to which SCP domain to another SCP 2 or NF as part of the SCP 1 profile in the NRF discovery procedures. Moreover, in certain example embodiments, the other NF or SCP 2 that wants to send a message to SCP 1 may know by configuration, its own SCP domain In addition, the other NF or SCP 2 may select as the destination for the message, an SCP address or FQDN that is related to its own SCP domains in the SCP 1 profile from the SCP addresses or FQDNs in the SCP 1 profile.

FIG. 3 illustrates an example set of tables relating to definitions of a type of SCP information, and definitions of a type of SCP domain information, according to certain example embodiments. As illustrated in FIG. 3, attribute names and data types may be provided. An explanation of the documentation conventions used in the tables may be found in TS 29.501. For data types in ScpInfo, SCP specific NF profile additions are described. According to certain example embodiments, the data type Scpinfo may be embedded as a value of attribute Scpinfo in the data type NFProfile. According to other example embodiments, within data type Scpinfo, an attribute scpDomainInfoList provides SCP domain specific information, for example, structured as a map with map entries defined per SCP domain and where each map entry may be used to describe how FQDN or addresses of IP interfaces relate to SCP domains the SCP is interconnected with, and describes in particular the SCP addresses or FQDNs per SCP domain. Further, in some example embodiments, the SCP domain ID may serve as a key to the map entry for the corresponding SCP domain and data Type ScpDomainInfo as a value. In certain example embodiments, the data type may describe IP addresses or FQDN of the SCP towards the SCP domain, and include attributes FQDN, Ipv4 addresses, and Ipv6 addresses.

As illustrated in FIG. 3, attributes FQDN, Ipv4Addresses, and Ipv6Addresses may be defined in the NFProfile data type. According to certain example embodiments, if a value of Scpinfo data type includes any of those attributes, they may apply instead of attributes FQDN, Ipv4Addresses, and Ipv6Addresses within the NFProfile data type for the corresponding SCP domain. However, if a value of Scpinfo data type includes none of those attributes, attributes FQDN, Ipv4Addresses, and Ipv6Addresses within the NFProfile data type may apply for the corresponding SCP domain. Additionally, according to certain example embodiments, type ScpDomainInfo may include attributes describing remote addresses in the SCP domain that are reachable through the SCP. This may be to handle cases with overlapping private IP address spaces in use in different SCP domains.

Figure 4:
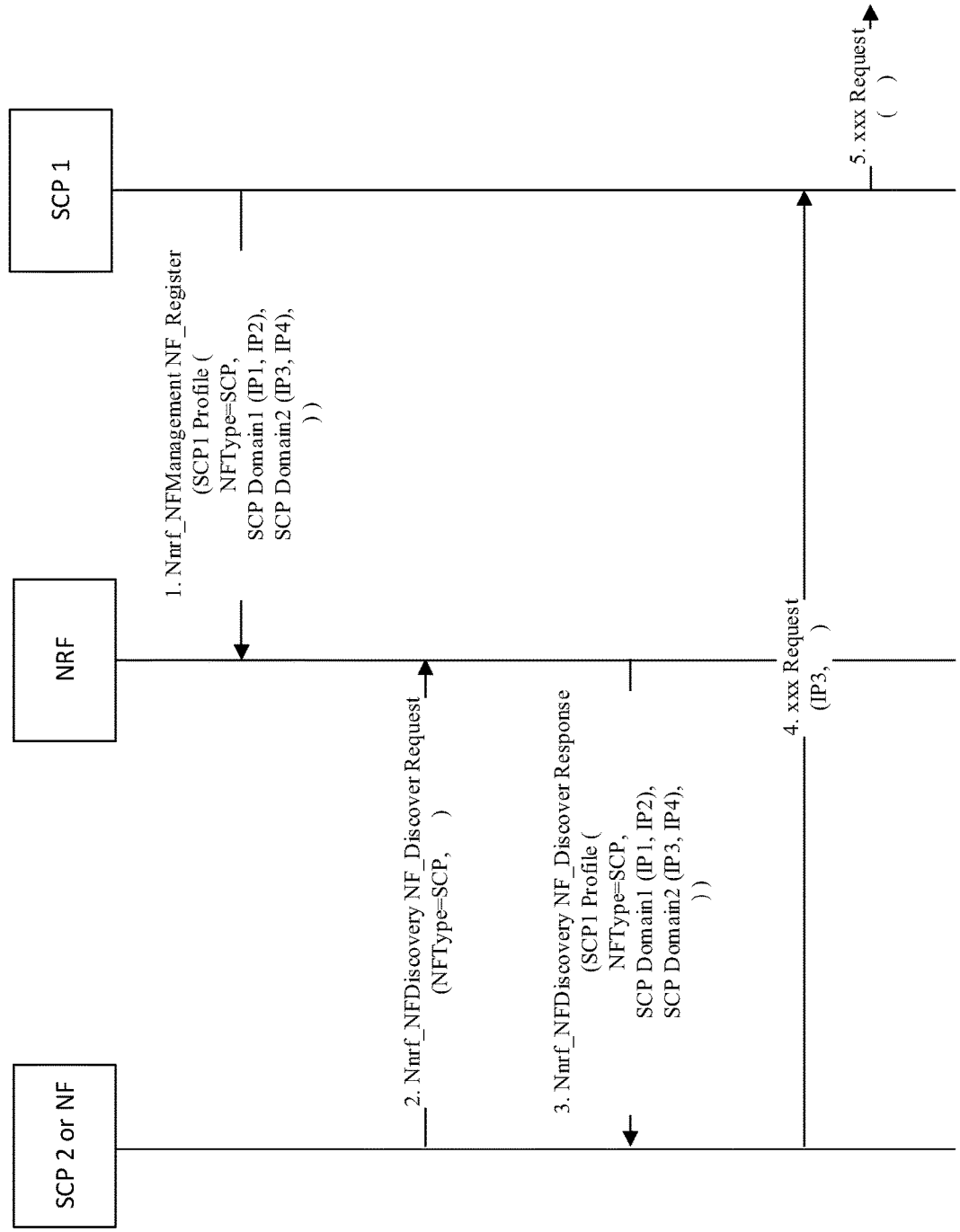
FIG. 4 illustrates an example signal diagram of SCP interconnections, according to certain example embodiments.

FIG. 4 illustrates an example signal diagram of SCP interconnections, according to certain example embodiments. For instance, according to certain example embodiments, before procedure 1 occurs in example of FIG. 4, certain prerequisites may be applicable. For example, SCP 1 may be interconnected with IP addresses or FQDNs IP1 and IP2 to SCP domain 1, and interconnected with IP addresses or FQDNs IP3 and IP4 to SCP domain 2. Another prerequisite may include the SCP 2 or NF being interconnected to SCP domain 2.

As illustrated in FIG. 4, at procedure 1, SCP 1 may power up and send a Nnrf_NFManagement service NF_Register service operation to the NRF to register SCP 1 with the NRF. The Nnrf_NFManagement service allows a NF or an SCP instance in a serving PLMN to register, update or deregister its profile in the NRF. Moreover, the Nnrf_NFManagement service may allow an NF or an SCP to subscribe to be notified of registration, deregistration, and profile changes of NF or SCP instances, along with their potential NF services. In some example embodiments, the Nnrf_NFmanagement service may also allow checking whether the registered NFs and SCPs are operative. According to certain example embodiments, the SCP may be treated by the Nnrf_NFManagement service in the same way as NFs. For instance, the SCP may be designated with a specific NF type and NF instance ID. However, the SCP may not support certain services. Thus, in certain example embodiments, references to NF or NF profile may apply to an SCP. In other example embodiments, Nnrf_NFManagement service NF_Update service operation may be used to update a profile earlier registered with NF_Register. According to certain example embodiments, SCP 1 may provide, in the service operation, its own profile and indicate in that profile that it is interconnected with IP addresses or FQDNs IP1 and IP2 to SCP domain 1, and with IP addresses or FQDNs IP3 and IP4 to SCP domain 2. Upon receipt of the service operation, the NRF may store the profile of SCP 1.

According to certain example embodiments, various service operations may be defined for the Nnrf_NFManagement service. For example, one service operation may be NFRegister, which allows an NF or SCP instance to register its profile in the NRF. This may include the registration of the general parameters of the NF or SCP instance, together with the list of potential services exposed by the NF instance. In addition, this service operation may not be allowed to be invoked from an NRF in a different PLMN.

Another service operation of the Nnrf_NFManagement service may be NFUpdate, which allows an NF or SCP instance to replace, or update partially, the parameters of its profile (including the parameters of the associated service, if any) in the NRF. It may also allow the ability to add or delete individual services offered by the NF instance. This service operation may not be allowed to be invoked from an NRF in a different PLMN.

A further service operation of the Nnrf_NFManagement service may be NFDeregister, which allows an NF or SCP instance to deregister its profile in the NRF, including the services offered by the NF instance, if any. As with other service operations, this service operation may not be allowed to be invoked from an NRF in a different PLMN.

Another service operation of the Nnrf_NFManagement service may include NFStatusSubscribe, which allows an NF or SCP instance to subscribe to changes on the status of NF or SCP instances registered in NRF. This service operation may be invoked by an NF Instance in a different PLMN (via the local NRF in that PLMN).

A further service operation of the Nnrf_NFManagement service may include NFStatusNotify, which allows the NRF to notify subscribed NF or SCP instances of changes on the status of NF or SCP instances. This service operation may be invoked directly between the NRF and an NF instance in a different PLMN (without involvement of the local NRF in that PLMN).

The Nnrf_NFManagement service may further include NFStatusUnsubscribe, which allows an NF or SCP instance to unsubscribe to changes on the status of NF or SCP instances registered in NRF. This service operation may be invoked by an NF Instance in a different PLMN (via the local NRF in that PLMN).

Additionally, the Nnrf_NFManagement service may include NFListRetrieval, which allows retrieving a list of NFs and SCPs currently registered in the NRF. This service operation may not be allowed to be invoked from an NRF in a different PLMN. The Nnrf_NFManagement service may further include NFProfileRetrieval, which allows retrieving the profile of a given NF or SCP instance. This service operation may not be allowed to be invoked from an NRF in a different PLMN.

At procedure 2, SCP 2 or NF may send an Nnrf_NFDiscovery service NF_Discover service operation to NRF, and query for SCPs. According to certain example embodiments, the Nnrf_NFDiscovery service NF_Discover service operation may allow SCP 2 or NF to discover the SCP profile of an SCP (e.g., SCP 1), including, among others, the FQDN or IP addresses to use to send signaling to SCP 1, that can be used to send a HTTP request to a target NF. Further, at procedure 3, the NRF may reply to the Nnrf_NFDiscovery service NF_Discover service operation by providing the stored profile of SCP 1, and may also provide stored profiles of other SCPs. At procedure 4, the NF or SCP 2 may send a request message to SCP 1. According to certain example embodiments, the request message may be an HTTP request message. In certain example embodiments, the NF or SCP 2 may know, via configuration of the NF or SCP 2, that it is interconnected with SCP domain 2. The NF or SCP 2 may also select, out of the SCP 1 profile, an FQDN or IP address that is interconnected with SCP domain 2 (e.g., IP3), which is the same SCP domain 2 that the NF or SCP 2 is interconnected with. In other example embodiments, NF or SCP 2 may send the request to IP3. At procedure 5, SCP 1 may forward the request message from SCP 2 or NF to another SCP or NF in the network.

Figure 5:
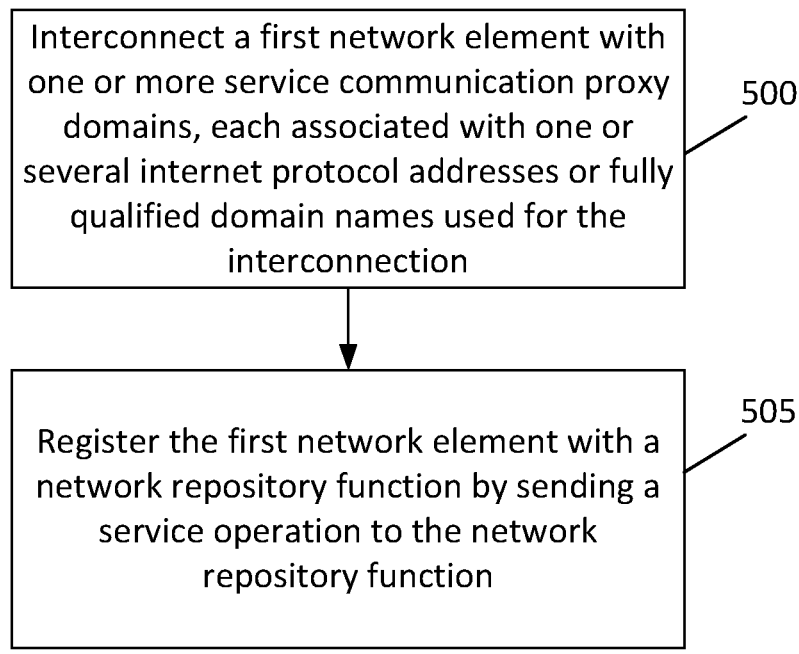
FIG. 5 illustrates an example flow diagram of a method, according to certain example embodiments.

FIG. 5 illustrates an example flow diagram of a method, according to certain example embodiments. In certain example embodiments, the flow diagram of FIG. 5 may be performed by a telecommunications network, network entity, network element, network function, or network node in a 3GPP system, such as LTE or 5G-NR. For instance, in an example embodiment, the method of FIG. 5 may be performed by a service communication proxy or network function for instance similar to apparatus 20 illustrated in FIG. 8(b).

According to certain example embodiments, the method of FIG. 5 may include, at 500, interconnecting a first network element with one or more service communication proxy domains, each associated with one or several internet protocol addresses or fully qualified domain names used for the interconnection. The method may also include, at 505, registering the first network element with a network repository function by sending a service operation to the network repository function. According to certain example embodiments, the service operation may include profile information of the first network element. According to other example embodiments, the profile information may include one or more service communication proxy domains, each associated with one or several internet protocol addresses or fully qualified domain names.

According to certain example embodiments, the method may further include receiving a message from a second network element. According to other example embodiments, the message may be received via a specific destination address or fully qualified domain name contained in the profile information based on a service communication proxy domain the second network element uses for communicating with the first network element. In certain example embodiments, the method may further include forwarding the message to one or more other network elements. In some example embodiments, the first network element may be a service communication proxy. In other example embodiments, the second network element may be a service communication proxy or a core network function.

Figure 6:
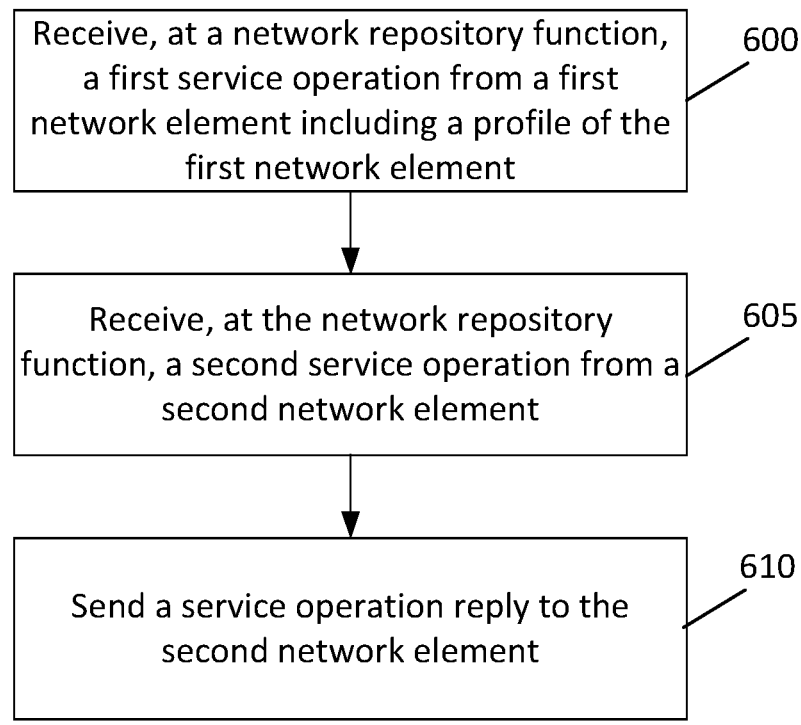
FIG. 6 illustrates an example flow diagram of another method, according to certain example embodiments.
Figure 8A:
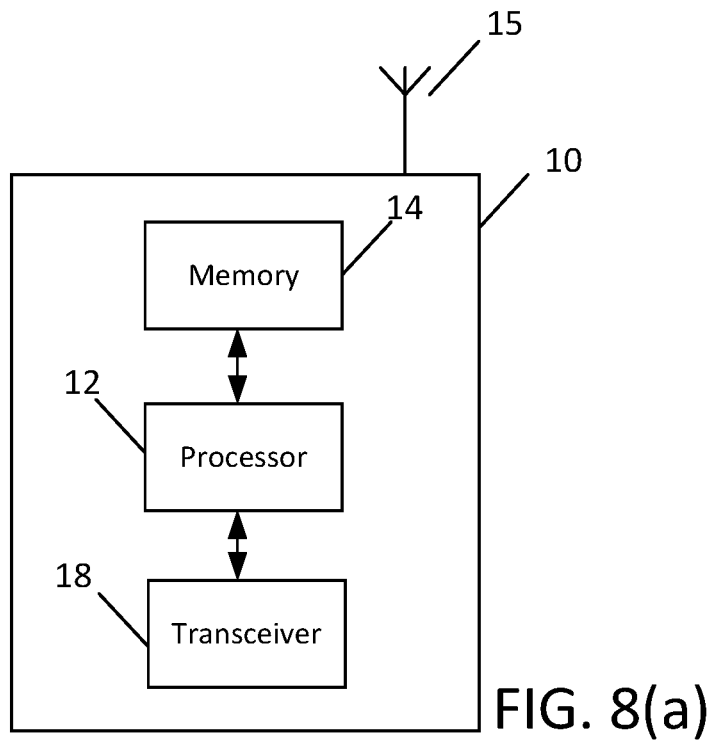
FIG. 8(a) illustrates an apparatus, according to certain example embodiments.

FIG. 6 illustrates an example flow diagram of another method, according to certain example embodiments. In an example embodiment, the method of FIG. 6 may be performed by a telecommunications network, network entity, network element, network function, or network node in a 3GPP system, such as LTE or 5G-NR. For instance, in an example embodiment, the method of FIG. 6 may be performed by a network repository function, for instance similar to apparatus 10 illustrated in FIG. 8(a).

According to certain example embodiments, the method may include, at 600, receiving, at a network repository function, a first service operation from a first network element comprising a profile of the first network element. The method may also include, at 605, receiving, at the network repository function, a second service operation from a second network element. The method may further include, at 610, sending a service operation reply to the second network element. According to certain example embodiments, the service operation reply may include the profile of the first network element. According to other example embodiments, the profile may include one or more service communication proxy domains, each associated with one or several internet protocol addresses or fully qualified domain names.

Figure 7:
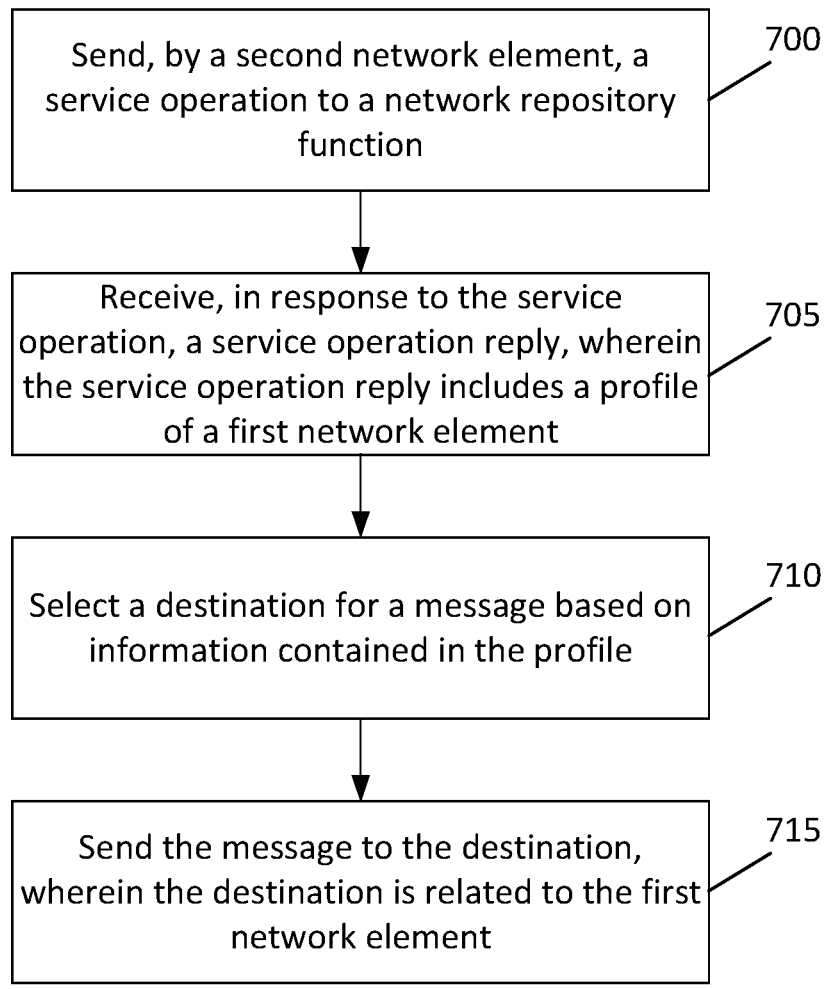
FIG. 7 illustrates an example flow diagram of another method, according to certain example embodiments.

FIG. 7 illustrates an example flow diagram of another method, according to certain example embodiments. In an example embodiment, the method of FIG. 7 may be performed by a telecommunications network, network entity, network element, network function, or network node in a 3GPP system, such as LTE or 5G-NR. For instance, in an example embodiment, the method of FIG. 7 may be performed by a service communication proxy or network function for instance similar to apparatus 20 illustrated in FIG. 8(b).

According to certain example embodiments, the method may include, at 700, sending, by a second network element, a service operation to a network repository function. The method may also include, at 705, receiving, in response to the service operation, a service operation reply, wherein the service operation reply may include a profile of a first network element. The method may further include, at 710, selecting a destination for a message based on information contained in the profile. In addition, the method may include, at 715, sending the message to the destination, wherein the destination may be related to the first network element. According to certain example embodiments, the information contained in the profile may include one or more service communication proxy domains, each associated with one or several internet protocol addresses or fully qualified domain names.

According to certain example embodiments, the selecting the destination for the message may include selecting one or more internet protocol addresses or fully qualified domain names associated with the service communication proxy domain used to communicate with the first network element. In other example embodiments, the first network element may be a service communication proxy. In certain example embodiments, the second network element may be a service communication proxy or a core network function.

FIG. 8(*a*) illustrates an apparatus 10 according to an example embodiment. In an embodiment, apparatus 10 may be a network element, node, host, or server in a communication network or serving such a network. For example, apparatus 10 may be a network repository function, an SCP, any 5GC NF (for example an AMF, SMF, PCF, or UDM) or element in a communications network or associated with such a network, or other similar device and/or elements associated with a radio access network (RAN), such as an LTE network, 5G or NR. It should be noted that one of ordinary skill in the art would understand that apparatus 10 may include components or features not shown in FIG. 8(*a*).

In some example embodiments, apparatus 10 may include one or more processors, one or more computer-readable storage medium (for example, memory, storage, or the like), one or more radio access components (for example, a modem, a transceiver, or the like), and/or a user interface. In some embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 8(*a*).

As illustrated in the example of FIG. 8(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8(*a*), multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-4 and 6.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-4 and 6.

In some embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device). In certain embodiments, apparatus 10 may further include a user interface, such as a graphical user interface or touchscreen.

In an embodiment, memory 14 stores software modules that provide functionality when executed by processor 12.

The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to an example embodiment, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some embodiments, transceiver 18 may be included in or may form a part of transceiving circuitry.

As discussed above, according to certain example embodiments, apparatus 10 may be a network repository function, for example. According to certain embodiments, apparatus 10 may be controlled by memory 14 and processor 12 to perform the functions associated with example embodiments described herein. For instance, in certain example embodiments, apparatus 10 may be controlled by memory 14 and processor 12 to receive a first service operation from a first network element including a profile of the first network element. Apparatus 10 may also be controlled by memory 14 and processor 12 to receive a second service operation from a second network element. In addition, apparatus 10 may be controlled by memory 14 and processor 12 to send a service operation reply to the second network element. According to certain example embodiments, the service operation reply may include the profile of the first network element. According to other example embodiments, the profile may include one or more service communication proxy domains, each associated with one or several internet protocol addresses or fully qualified domain names.

Figure 8B:
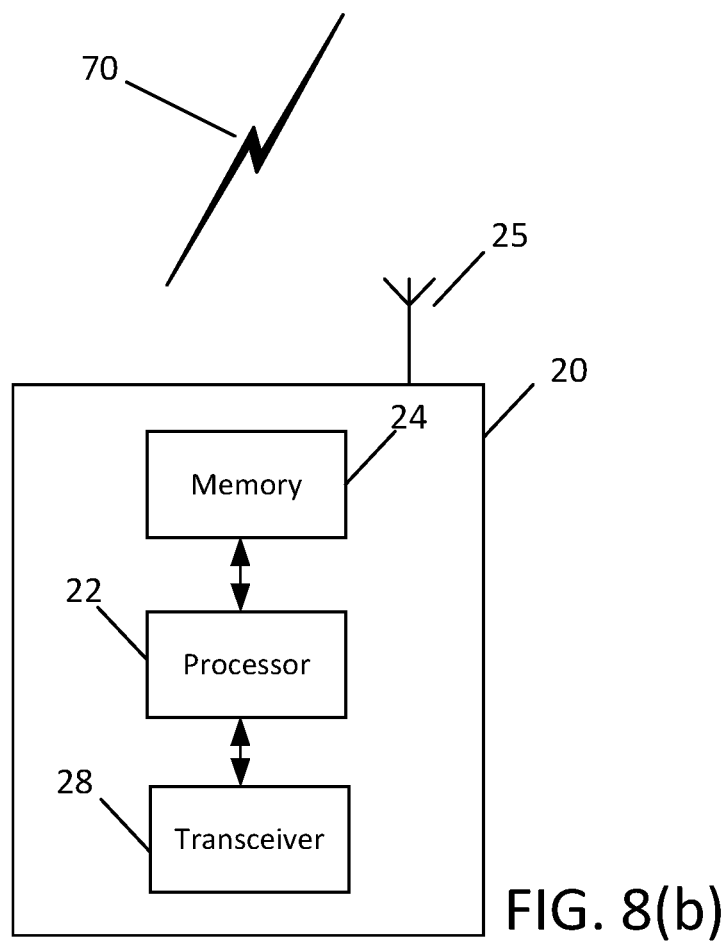
FIG. 8(b) illustrates another apparatus, according to certain example embodiments.

FIG. 8(b) illustrates an apparatus 20 according to an example embodiment. In an example embodiment, the apparatus 20 may be a network element, node, host, or server in a communication network or serving such a network. For example, apparatus 20 may be a network element including, for example, a service communication proxy or network function associated with a radio access network (RAN), such as an LTE network, 5G or NR. It should be noted that one of ordinary skill in the art would understand that apparatus 20 may include components or features not shown in FIG. 8(b).

As illustrated in the example of FIG. 8(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8(b), multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-5 and 7.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-5 and 7.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other embodiments, transceiver 18 may be capable of transmitting and receiving signals or data directly. Additionally or alternatively, in some embodiments, apparatus 20 may include an input and/or output device (I/O device).

In an embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some embodiments, processor 22 and memory 24 may be included in or may form a part of processing circuitry or control circuitry. In addition, in some embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

For instance, in certain example embodiments, apparatus 20 may be controlled by memory 24 and processor 22 to interconnect the apparatus with one or more service communication proxy domains, each associated with one or several internet protocol addresses or fully qualified domain names used for the interconnection. Apparatus 20 may also be controlled by memory 24 and processor 22 to register the apparatus with a network repository function by sending a service operation to the network repository function. According to certain example embodiments, the service operation may include profile information of the first network element. According to other example embodiments, the profile information may include one or more service communication proxy domains, each associated with one or several internet protocol addresses or fully qualified domain names.

In other example embodiments, apparatus 20 may be controlled by memory 24 and processor 22 to send a service operation to a network repository function. Apparatus 20 may also be controlled by memory 24 and processor 22 to receive, in response to the service operation, a service operation reply, wherein the service operation reply may include a profile of a first network element. Apparatus 20 may further be controlled by memory 24 and processor 22 to select a destination for a message based on information contained in the profile. In addition, apparatus 20 may be controlled by memory 24 and processor 22 to send the message to the destination, wherein the destination may be related to the first network element. According to certain example embodiments, the information contained in the profile may include one or more service communication proxy domains, each associated with one or several internet protocol addresses or fully qualified domain names.

Further example embodiments may provide means for performing any of the functions, steps, or procedures described herein. For example one example embodiment may be directed to an apparatus that includes means for receiving a first service operation from a first network element comprising a profile of the first network element. The apparatus may also include means for receiving a second service operation from a second network element. The apparatus may further include means for sending a service operation reply to the second network element. According to certain example embodiments, the service operation reply may include the profile of the first network element. According to other example embodiments, the profile may include one or more service communication proxy domains, each associated with one or several internet protocol addresses or fully qualified domain names.

Other example embodiments may be directed to a further apparatus that includes means for interconnecting with one or more service communication proxy domains, each associated with one or several internet protocol addresses or fully qualified domain names used for the interconnection. The apparatus may also include means for registering the first network element with a network repository function by sending a service operation to the network repository function. According to certain example embodiments, the service operation may include profile information of the first network element. According to other example embodiments, the profile information may include one or more service communication proxy domains, each associated with one or several internet protocol addresses or fully qualified domain names.

Further example embodiments may be directed to an apparatus that includes means for sending a service operation to a network repository function. The apparatus may also include means for receiving, in response to the service operation, a service operation reply, wherein the service operation reply may include a profile of a first network element. The apparatus may further include selecting a destination for a message based on information contained in the profile. In addition, the apparatus may include means for sending the message to the destination, wherein the destination may be related to the first network element. According to certain example embodiments, the information contained in the profile may include one or more service communication proxy domains, each associated with one or several internet protocol addresses or fully qualified domain names.

Certain example embodiments described herein provide several technical improvements, enhancements, and/or advantages. In some example embodiments, it may be possible to enhance SCP profiles registered in NRF to describe which addresses or FQDNs relate to which SCP domain Other example embodiments may enable connectivity of the SCP to several different physical networks and SCP domains, and allow other SCPs or NFs to successfully communicate with the SCP using SCP addressing information applicable to the SCP domain they use to communicate with the SCP.

A computer program product may include one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that certain example embodiments of the disclosure as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

PARTIAL GLOSSARY

3GPP 3' Generation Partnership Project
5GC 5G Core Network
AMF Access and Mobility Management Function
CN Core Network
eNB Enhanced Node B
FQDN Fully Qualified Domain Name
gNB 5G or Next Generation NodeB
IP Internet Protocol
LTE Long Term Evolution
NF Network Function
NR New Radio
NRF Network Repository Function
PCF Policy Control Function
SCP Service Communication Proxy
SMF Session Management Function
UDM Unified Data Management
UE User Equipment

We claim:

1. A method, comprising:
interconnecting a service communication proxy to each respective domain of a plurality of service communication proxy domains with one or more internet protocol addresses or fully qualified domain names; and
registering a profile of the service communication proxy with a network repository function by sending a service operation request to register the profile of the service communication proxy to the network repository function,
wherein the service operation request comprises the profile of the service communication proxy,
wherein the profile of the service communication proxy comprises information about each respective interconnection between the service communication proxy and each respective service communication proxy domain of the plurality of service communication proxy domains, the information comprising the one or more internet protocol addresses or fully qualified domain names which interconnects the service communication proxy to the respective service communication proxy domains of the plurality of service communication proxy domains,
wherein the profile of the service communication proxy is discoverable by a second service communication proxy; and
wherein the second service communication proxy and the service communication proxy are interconnected to a same service communication proxy domain of the plurality of service communication proxy domains.

2. The method according to claim 1, further comprising receiving a message from the second service communication proxy, wherein the message is received via the internet protocol address or the fully qualified domain name which interconnects the service communication proxy to the same service communication proxy domain of the plurality of service communication proxy domains that the second service communication proxy uses for communicating with the service communication proxy.

3. The method according to claim 2, further comprising forwarding, by the service communication proxy, the message to one or more other network elements.

4. An apparatus, comprising:
at least one processor; and
at least one memory comprising computer program code of a service communication proxy,
the computer program code configured to, when executed by the at least one processor, to cause the apparatus at least to:
interconnect the service communication proxy to each respective domain of a plurality of service communication proxy domains with one or more internet protocol addresses or fully qualified domain names; and
register a profile of the service communication proxy with a network repository function by sending a service operation request to register the profile of the service communication proxy to the network repository function, the profile of the service communication proxy comprising information about each respective interconnection between the service communication proxy and each respective service communication proxy domain of the plurality of service communication proxy domains, the information comprising the one or more internet protocol addresses or fully qualified domain names which interconnects the service communication proxy to the respective service communication proxy domains of the plurality of service communication proxy domains;

wherein the profile of the service communication proxy is discoverable by a second service communication proxy; and wherein the second service communication proxy and the service communication proxy are interconnected to a same service communication proxy domain of the plurality of service communication proxy domains.

5. The apparatus according to claim 4, wherein the computer code is configured to, when executed by the at least one processor, to cause the apparatus to:

receive a message from the second service communication proxy, wherein the message is received via the internet protocol address or the fully qualified domain name which interconnects the service communication proxy to the same service communication proxy domain of the plurality of service communication proxy domains that the second service communication proxy uses for communicating with the service communication proxy.

6. The method according to claim 5, wherein the computer code is configured to, when executed by the at least one processor, to cause the apparatus to:

forward the message to one or more other network elements.

7. An apparatus, comprising:

at least one processor; and at least one memory comprising computer program code of a second communication proxy, the computer program code configured to, when executed the at least one processor, to cause the apparatus at least to perform:

sending, to a network repository function, a service operation request to discover a first service communication proxy;

receiving, in response to the service operation request, a service operation reply, wherein the service operation reply comprises a profile of the service communication proxy, the profile of the first service communication proxy including information about respective interconnections between the first service communication proxy and respective ones of the service communication proxy domains of a plurality of service communication proxy domains, the information comprising one or more internet protocol addresses or fully qualified domain names via which the first service communication proxy is interconnected to a respective one of the service communication proxy domains of the plurality of service communication proxy domains;

selecting, based on the information in the profile of the first service communication proxy and a service communication proxy domain that the second service communication proxy or network function is interconnected to, a destination for a message to be sent to the first communication proxy, wherein the destination is one of the one or more of the internet protocol addresses or fully qualified domain names of one of the service communication domains via which the first service communication proxy is interconnected to the one of the service communication domains, and wherein the service communication proxy domain that the second service communication proxy is interconnected to and the one service communication proxy domain that the first service communication proxy is interconnected to are the same; and sending the message to the destination.

8. The apparatus according to claim 7, wherein the profile of the first service communication proxy is discoverable by the second service communication proxy or the network function.

9. The apparatus according to claim 7, wherein the computer program code is configured to, when executed by the at least one processor, cause the apparatus to perform:

registering a profile of the second service communication proxy with the network repository function by sending a service operation request to register the profile of the second service communication proxy with the network repository function.

10. The apparatus according to claim 7, wherein the profile of the second service communication proxy or the network function comprises:

information about respective interconnections between the first service communication proxy and respective ones of the service communication proxy domains of a plurality of service communication proxy domains, the information about each respective interconnection between the first service communication proxy and a respective one of the service communication proxy domains comprising one or more internet protocol addresses or fully qualified domain names via which the first service communication proxy is interconnected to the respective one of service communication proxy domains of the plurality of service communication proxy domains are interconnected.

* * * * *